INVENTOR
Kurt Veser
Karl Heinz Mock

ATTORNEY

United States Patent Office 3,374,829
Patented Mar. 26, 1968

3,374,829
GAS PURGING SEAL IN ROTARY REGENERATOR
Kurt Veser, Schwetzingen, and Karl Heinz Mock, Neckargemund, Germany, assignors to Svenska Rotor Maskiner Aktiebolag, Nacka, Sweden, a corporation of Sweden
Filed Aug. 11, 1966, Ser. No. 571,872
Claims priority, application Germany, Aug. 13, 1965, K 56,880
4 Claims. (Cl. 165—7)

ABSTRACT OF THE DISCLOSURE

Apparatus for use in rotary regenerative air preheaters which provides for reduction of gas flow leakage from the hot flue gas portion of the preheater to the air portion of the preheater, which apparatus includes a flue gas collecting chamber positioned adjacent a flue gas sector plate and also positioned along the edge adjacent the air flow portion of the preheater. The flue gas collecting chamber has an opening toward the end surface of the regenerator body which communicates with the flue gas supply duct so that the flue gas content of each compartment of the preheater leaving the gas flow portion thereof is forced out of the compartment and into the collecting chamber by air entering each compartment in the air portion of the preheater.

The present invention relates to a rotary regenerative air preheater of the type which comprises an annular regenerator body, radial partitions in said regenerator body dividing said body into a plurality of open-ended sectorial compartments each containing regenerative material, supply and discharge duct means for directing separate flows of air and flue gases in opposite directions through different compartments of said regenerator body, said regenerator body and said duct means being rotatable relatively to each other, sector-shaped plates connected to said duct means and positioned in sealing engagement with the ends of said regenerator body to prevent intermingling of the air and gas flows at the transition between said duct means and said regenerator body.

The invention has for its object to provide an air preheater of this kind which can be used also in such plants in which the combustion takes place while using almost the theoretically required air quantity or an excess of air amounting to 1 to 2% only. Such small values of the excess of air can be used in oil furnaces only if it is possible to prevent introduction of flue gases into the air duct, that is into the air supplied to the burners.

It has been proved that flue gas entering the air duct gives rise to pressure variations as well as periodic deficiency of oxygen. This deficiency of oxygen may result in a strong sooting of the burners or even extinguishing of the flame. However, if the air quantity is increased in order to avoid deficiency of oxygen there will periodically be a rather large excess of air which is also undesirable.

According to the invention these drawbacks are obviated thereby, that one of the sector plates at the gas supply end of the regenerator body is provided with a collecting chamber outside and along the edge adjacent to the air flow, said collecting chamber being open towards the end surface of the regenerator body and communicating with the gas supply duct, whereby the gas contents of each compartment leaving the gas flow is forced out of the compartment and returned to the gas supply duct by air entering the compartment at the air supply end of the regenerator body, before the compartment is introduced into the air flow. Thus, flue gas is not sluiced into the air flow and therefore the quality of the combustion air does not vary which makes it possible to use a very small excess of air.

The invention will now be described more in detail with reference to the accompanying drawing which illustrates a rotary regenerative air preheater of the type having a rotatable matrix and stationary ducts.

Figure 1:
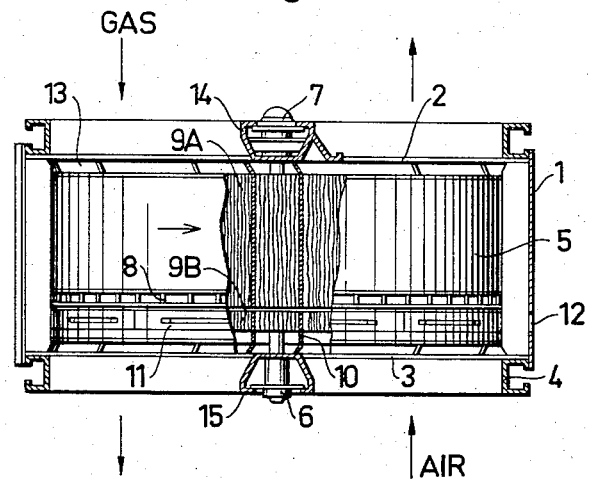
FIG. 1 is a side elevation of the air preheater which is shown partly in section.

The air preheater illustrated is of the same general type as that shown in for instance U.S. Patent 2,681,209. Thus, the housing of the preheater is square-shaped in cross-section and comprises four plane side walls, an upper end wall 2 and a lower end wall 3. The square-shaped end walls 2 and 3 are provided with sector-shaped apertures to which are connected ducts (not shown) for air and flue gases. The walls are secured to a frame work formed by beams 4.

In the housing there is provided a rotor 5 which is carried by a lower thrust bearing 6 and guided at the top by a radial bearing 7. The rotor is adapted to rotate in counter-clockwise direction as indicated by an arrow and it can be driven in any conventional manner by means of one or more gears meshing with the rack 8 mounted on the outside of the rotor.

In FIG. 1 part of the rotor 5 is shown in section in order to illustrate the interior thereof. The rotor is in known manner divided into a plurality of sectorial compartments, for instance twelve, by means of radial partitions 10 and the compartments are filled with a regenerative mass 9, preferably consisting of metal plates which may be arranged for instance substantially radially.

As indicated by arrows in FIG. 1 the flue gas is supplied from above to the left portion of the preheater while the air is supplied from below to the right portion of the preheater. The two fluid flows are separated by sector plates 14 and 15.

In the embodiment shown the regenerative mass is in known manner subdivided into two layers viz. a main layer 9A and a thinner layer 9B at the cold end of the regenerator. The plates of the thinner layer 9B are provided in sectional boxes 11 which can be taken out through an opening 12 in one of the side walls 1 normally closed by a cover. The plates at the cold end of the rotor are subjected to corrosion to a higher degree than the rest of the mass and therefore these plates must be exchanged more frequently or if desired be turned upside down provided that only the outermost edge portions of the plates are damaged.

At the edges of the partitions 10 there are provided flexible sealing strips 13 which cooperate with the sector plates 14 and 15 when the compartments move from one fluid flow into the other.

Figure 2:
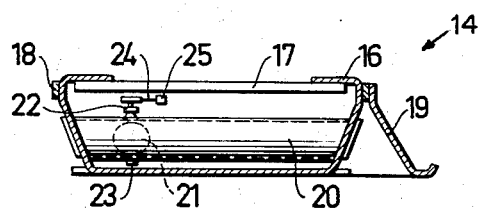
FIG. 2 is a cross-section on a larger scale of sector plate 14 of the air preheater according to FIG. 1.
Figure 3:
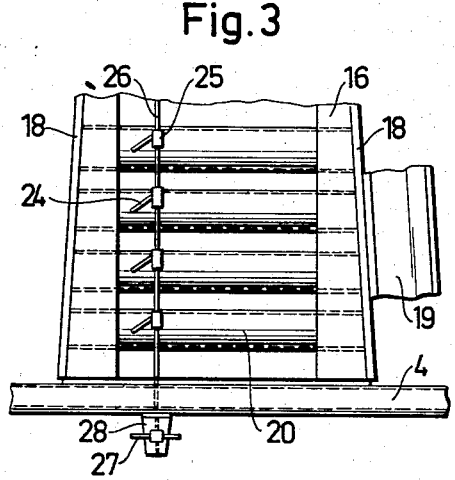
FIG. 3 is a plan view of a portion of sector plate 14 in FIG. 2.

In FIGS. 2 and 3 a sector plate 14 at the upper (hot) end of the preheater is shown more in detail. The sector plate is made from sheet metal 16 which is bent such that the sector plate has a chute-like cross-section. At their radially outer ends the sector plates are secured to the housing for instance by welding and in the region of the rotor axis they are reinforced by flat iron bars 17 which support the bearings for the rotor shaft. The sector plates are further reinforced by means of flat iron bars 18 welded to the sides of the plates.

The construction just described is common to both sector plates 14 and 15. However, according to FIGS. 2 and 3 the sector plate 14 at the hot end of the regenerator body is further provided with a plate 19 extending along and secured to that edge of the sector plate 14 below which the compartments pass immediately before they enter the air flow. This plate 19 forms together with the side wall of the chute-like sector plate a collecting chamber which is open towards the end surface of the regenerator body and communicates with the gas supply duct through conduits 20. These conduits are provided with butterfly valves 21 which are carried by pivot shafts 22 journalled in bearings 23.

Each pivot shaft 22 carries an operating lever 24 and all levers 24 are by a suitable means 25 pivotally connected to a common push rod 26 which extends through the adjacent housing beam 4. Outside the housing the rod 26 is provided with a handle 27 by means of which all valves can be adjusted into desired positions. The handle 27 can be locked in any position by means of any suitable device cooperating with the bracket device 28 along which the handle 27 moves during the adjustment.

During operation, when a compartment moves from the gas flow towards the air flow (from the left to the right in FIG. 1) it is initially filled with flue gases. When the lower edge of its leading radial wall has passed the lower sector plate 15 air enters the compartment from below and forces the flue gases upwardly out of the compartment and into the collecting chamber and further through the conduits 20 back to the flue gas flow. In this manner each compartment will be scavenged with air before the top of the compartment is uncovered by the plate 19 whereby flue gases are prevented from entering the air flow.

Due to the fact that the gas pressure is lower than the air pressure the gas has no tendency to leak into the air flow and as described above the gas cannot either be sluiced into the air. Therefore, the heated air supplied to the burners is homogeneous and does not contain courses of flue gas.

By suitable adjustment of the valves 21, under all operating conditions the quantity of scavenging air is just sufficient to expel the flue gases out of the compartments so that substantially no air or at least no considerable air quantities pass through the conduits 20 to the gas flow.

The optimum positions of the valves 20 at different boiler loads can be determined empirically. It is then easy to adjust the valves manually or by means of automatic devices in dependence on the quantities of air and/or flue gases passing through the air preheater.

In the embodiment described and shown the regenerative mass is rotatable while the ducts are stationary but it is evident that the invention can also be applied to air preheaters having a stationary regenerative mass and rotatable duct means. To a man skilled in the art it will not involve any problems to provide means such as a cam device or the like for adjustment of the valves 21 even though the sector plate 14 is rotating. Naturally the butterfly valves shown can be replaced by valve means of other types such as slide valves.

What we claim is:

1. A rotary regenerative air preheater, particularly for oil furnaces, comprising an annular regenerator body, radial partitions in said regenerator body dividing said body into a plurality of open-ended sectorial compartments each containing regenerative material, supply and discharge duct means for directing separate flows of air and flue gases in opposite directions through different compartments of said regenerator body, said regenerator body and said duct means being rotatable relatively to each other, sector-shaped plates connected to said duct means and positioned in sealing engagement with the ends of said regenerator body to prevent intermingling of the air and gas flows at the transition between said duct means and said regenerator body, characterized in that one of the sector plates at the gas supply end of the regenerator body is provided with a collecting chamber outside and along the edge adjacent to the air flow, said collecting chamber being open towards the end surface of the regenerator body and communicating with the gas supply duct, whereby the gas contents of each compartment leaving the gas flow is forced out of the compartment and returned to the gas supply duct by air entering the compartment at the air supply end of the regenerator body, before the compartment is introduced into the air flow.

2. Preheater as defined in claim 1, in which the collecting chamber is connected with the gas supply duct by means of at least one connecting conduit extending transversely through the sector plate.

3. Preheater as defined in claim 2, in which each connecting conduit is provided with a control valve.

4. Preheater as defined in claim 3 comprising a plurality of connecting conduits, in which the control valves are mechanically coupled to each other.

References Cited

UNITED STATES PATENTS

| | | | |
|---|---|---|---|
| 1,586,817 | 6/1926 | Ljungstrom | 165—9 |
| 2,865,611 | 12/1958 | Bentele | 165—9 |
| 3,315,729 | 4/1967 | Mondt | 165—5 |

ROBERT A. O'LEARY, *Primary Examiner.*

A. W. DAVIS, *Assistant Examiner.*